July 5, 1932.  L. M. PERSONS  1,865,641
DAMPER CONTROL FOR HEATING FURNACES
Filed Nov. 1, 1928   2 Sheets-Sheet 1
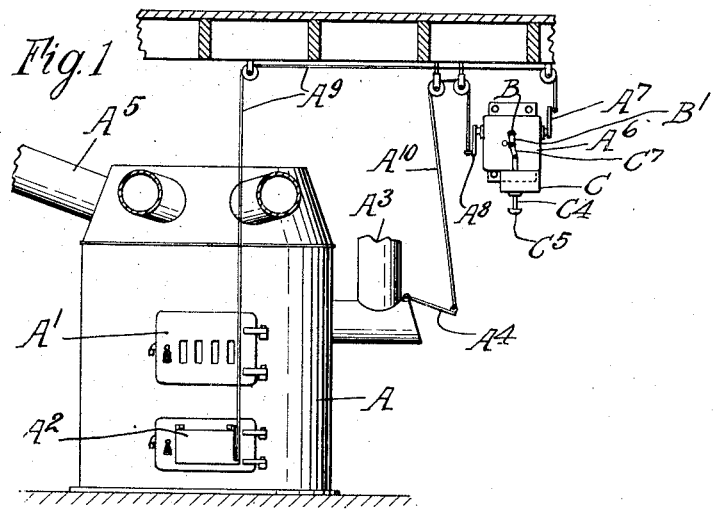
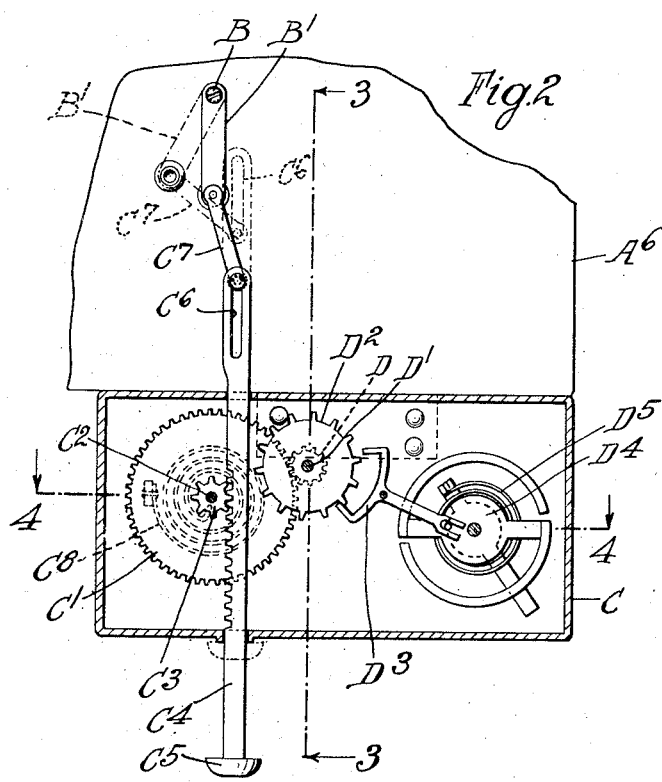
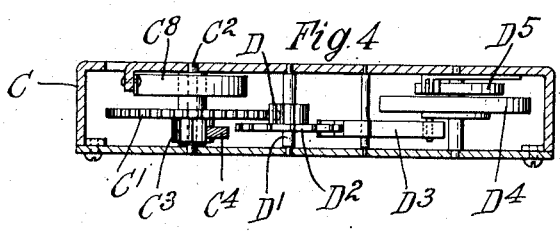
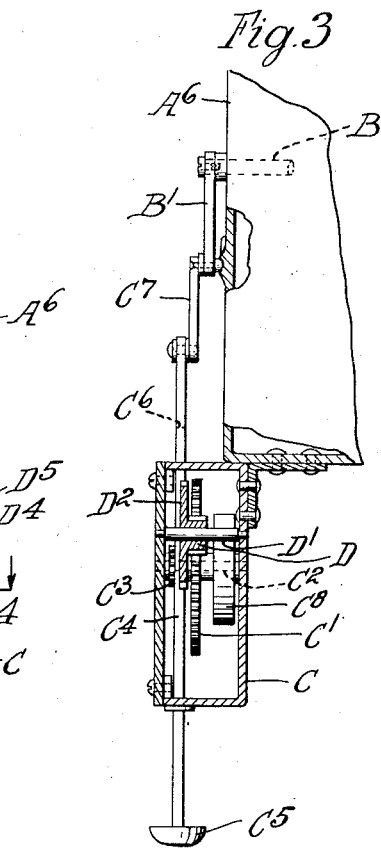
Inventor
Laurence M. Persons
by Parker & Carter
Attorneys.

Patented July 5, 1932

1,865,641

UNITED STATES PATENT OFFICE

LAURENCE M. PERSONS, OF CHICAGO, ILLINOIS

DAMPER CONTROL FOR HEATING FURNACES

Application filed November 1, 1928. Serial No. 316,570.

My invention relates to improvements in damper control for heating furnaces and the like and has for one object to provide an automatic control which is associated with a manual control which can be manipulated to set the dampers in predetermined position as for instance in the proper position for firing and which will automatically after a predetermined period cause a resumption of automatic control of the dampers so that if the operator forgets to reset the dampers or forgets to reset the automatic control after he has fired, the automatic control will nevertheless recommence. Other objects will appear from time to time throughout the specification and claims.

My invention is illustrated more or less diagrammatically in the accompanying drawings, wherein—

Figure 1 is a side elevation of a furnace and automatic damper control;

Figure 2 is a section through the reset housing showing the reset mechanism in elevation;

Figure 3 is a section along the line 3—3 of Figure 2;

Figure 4 is a section along the line 4—4 of Figure 2.

Like parts are indicated by like characters throughout.

Figure 5:
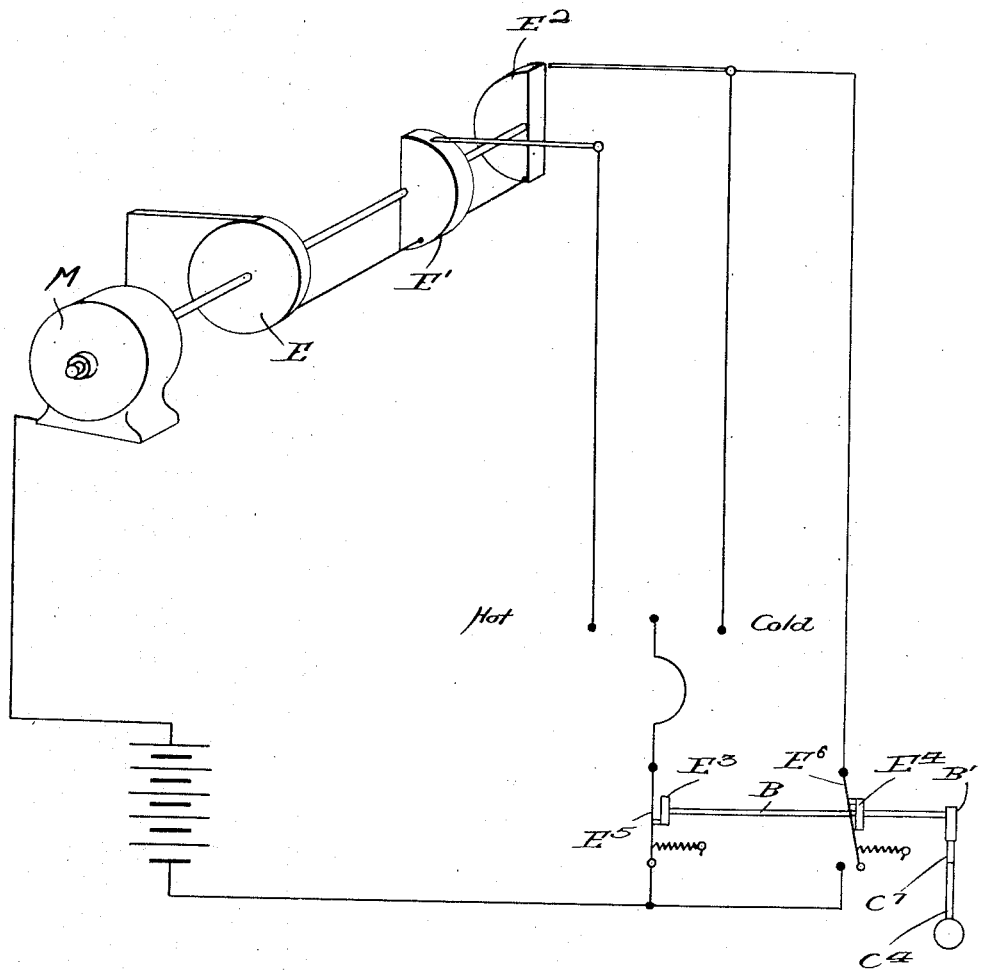
Fig. 5 is a diagrammatic showing of the automatic control and its relation to the manual operator.

A is a furnace having a fire door $A^1$, a cold air damper $A^2$ a flue $A^3$, a check damper $A^4$ in the flue and hot air ducts $A^5$. $A^6$ is a housing which contains a motor M, operated in the usual manner in response to a thermostat or other adjustable means T to drive the two cranks $A^7$ $A^8$, which through controlling cables $A^9$ $A^{10}$ operate the dampers $A^2$ $A^4$ so that when the parts are in the position shown in Figure 1, the cold air damper is closed, the check draft is open and the fire is checked. At other stages in the operation, the motor will reverse the position to close the check damper, open the cold air damper and cause active burning of the furnace. This latter position would be the desired position when the operator is going to work on the fire. It will be understood that the motor in the box $A^6$ places the dampers in one position or the other depending upon the control of the thermostat or other mechanism.

B is a control shaft by which the operator may cause motor operation to manipulate or control the dampers independent of the thermostat. This shaft has a crank $B^1$ through which operation may take place. The difficulty is that if the operator manipulates this shaft, for instance, to cause the motor to open the dampers and interferes with the automatic control of the motor and if he forgets to return the shaft to the normal position permitting the motor to control the dampers will remain open independent of thermostat or automatic control and the fire will burn out.

The automatic reset mechanism comprises therefore a housing C containing a clockwork which comprises a gear $C^1$ on a shaft $C^2$. On the same shaft $C^2$ is a pinion $C^3$ in mesh with a rack $C^4$ having a handle $C^5$. This rack extends through the housing C, is slotted at $C^6$ to engage pivotally and slidably the end of a link $C^7$ which link in turn is pivoted on the arm $B^1$. $C^8$ is a clock spring anchored at one end on the wall of the housing C, the other end on the shaft $C^2$.

D is a pinion in mesh with the gear $C^1$. This pinion is on an escapement shaft $D^1$ which carries a toothed escapement wheel $D^2$ adapted to be meshed with the usual type of balance arm $D^3$ controlled by a balance wheel $D^4$ and hair spring $D^5$ which is like any clock mechanism.

The shaft B is slightly out of line with the rack $C^4$ so that the parts are never on center. To manipulate the device the operator pushes up on the handle $C^5$, rotating by means of the rack $C^4$ the gear $C^3$ to wind the spring, there being interposed between the shaft $C^2$ and the gears $C^1$ an over-running clutch which forms no part of the invention and is therefore not shown so that the escapement wheel will not interfere with the setting and winding of the spring. This upward movement of the handle $C^5$ causes the lower pivot point of the link $C^7$ to assume the dotted line position at the bottom of the slot C⁶ and by the toggle action swings the arm B¹ to the position where motor operation is independent of the automatic control. Immediately the clockwork commences to operate and the spring gradually draws the rack down. As soon as the rack has descended an equal distance to the length of the slot further downward movement of the rack by toggle action throws the arm B¹ back to the normal position to permit automatic control of the damper operating motor. The time during which this downward movement of the handle equal to a length of the slot takes place is sufficient for the operation or inspection of the furnace so that it makes no difference whether the operator resets or not because the clockwork mechanism will do it for him.

In Fig. 5 is shown a diagrammatic illustration of the relationship between the manual and the automatic control.

In this view the shaft B is illustrated as being provided with cams E³ and E⁴ which contact with the switches E⁵ and E⁶ in such manner that when the rod C⁴ is operated the switch E⁵ will be closed and the switch E⁶ opened, or vice versa.

On the motor shaft are provided cams E′ and E² which are in circuit with the slip ring E and motor M for the purpose of limiting rotation of the motor to 180°.

From the foregoing it will be seen that the automatic control is normally in operation and that upon operation of the thermostat the motor will rotate 180° for the purpose of operating the damper and that upon movement of the shaft C⁴ the automatic control is broken and is not reestablished until the shaft C⁴ has assumed its lowered position. However, it may happen that it would be desired to stoke the furnace at a time when the check damper is open and it will be seen, therefore, that operation of the shaft C⁴ will close the circuit through the switch E⁶ and open the circuit through the switch E⁵, whereupon the motor will rotate 180° and close the check damper.

I claim:

1. The combination with a thermostatically controlled damper operating motor of a manual control therefor adapted to interrupt the thermostatic control independent of the thermostatic control, and automatic means for returning said manual control to its starting or neutral position, said means comprising a timing element adapted to reestablish the thermostatic control at a predetermined interval after manual operation of the control, said timing means comprising a clockwork adapted to be wound up by manipulation of the manually controlled member.

2. The combination with a furnace and dampers therefor, of a thermostatically controlled motor adapted normally to operate said dampers, a housing for said motor, manually operable means adapted to interrupt the normal control of the dampers by the thermostat, said means including a shaft penetrating the housing and a lever arm associated therewith, exterior to the housing, a rack member and means for guiding it for rectilinear movement, a link connection between said lever and said rack member, and means for returning said manually operable means to inoperative position, including a spring and a pinion, adapted to be rotated thereby, in mesh with said rack.

3. The structure of claim 2 characterized in that the rack is adapted in response to movement in one direction to wind up the spring which actuates the pinion for returning the rack in the opposite direction.

4. The combination with a furnace and dampers adapted to control the furnace draft, of a thermostatically controlled motor adapted to operate said dampers, a manually controlled member adapted to interrupt the control of the dampers by the thermostat, and motor means for returning the manually controlled member to inoperative position, said means including a spring and means for winding it up in response to the initial movement of the manually controlled member.

5. The combination with a furnace and dampers adapted to control the furnace draft, of a thermostatically controlled motor adapted to operate said dampers, a manually controlled member adapted to interrupt the control of the dampers by the thermostat, and motor means for returning the manually controlled member to inoperative position, said means including a spring, a rack and pinion connection between said spring and said manually controlled member, said spring being adapted, through said rack and pinion connection, to return the manually controlled member to its initial inoperative position.

6. The combination with a thermostatically controlled damper operating motor of a manual control therefor adapted to interrupt the thermostatic contact, independent of the thermostatic control, and automatic means for returning said manual control to its starting or neutral position, said means including a timing element adapted to reestablish the thermostatic control at a predetermined interval after manual operation of the control, said timing means comprising a clockwork having a spring directly connected to said manual control member for returning the same to neutral position.

Signed at Chicago, county of Cook and State of Illinois, this 30th day of October, 1928.

LAURENCE M. PERSONS.